(12) United States Patent
Wang et al.

(10) Patent No.: US 11,773,949 B1
(45) Date of Patent: Oct. 3, 2023

(54) ELECTRO-HYDRAULIC LINEAR BALL SCREW ACTUATORS

(71) Applicants: ZOOMLION Heavy Industry NA, Inc., Yorkville, WI (US); ZOOMLION Heavy Industry Science and Technology Co. Ltd., Changsha Hunan Province (CN)

(72) Inventors: Shu Wang, Yorkville, WI (US); Matthew Schoenberg, Kenosha, WI (US)

(73) Assignees: ZOOMLION HEAVY INDUSTRY NA, INC., Yorkville, WI (US); ZOOMLION HEAVY INDUSTRY SCIENCE AND TECHNOLOGY CO., LTD, Changsha Hunan Province (CN)

( * ) Notice: Subject to any disclaimer, the term of this patent is extended or adjusted under 35 U.S.C. 154(b) by 0 days.

(21) Appl. No.: 17/863,945

(22) Filed: Jul. 13, 2022

(51) Int. Cl.
  *F16H 25/22* (2006.01)
  *F16H 25/20* (2006.01)

(52) U.S. Cl.
  CPC . *F16H 25/2209* (2013.01); *F16H 2025/2081* (2013.01)

(58) Field of Classification Search
  CPC F15B 2015/1495; F15B 15/02; F15B 15/088; F16H 2025/2081; F16H 2025/2436; F16H 2025/204
  See application file for complete search history.

(56) References Cited

U.S. PATENT DOCUMENTS

| | | | |
|---|---|---|---|
| 7,397,209 B2 * | 7/2008 | Hirai | F15B 15/088 310/112 |
| 7,939,979 B2 * | 5/2011 | Hochhalter | H02K 11/21 310/80 |
| 9,611,922 B2 * | 4/2017 | Kohlmeyer | F16H 25/20 |
| 9,618,102 B2 * | 4/2017 | Hirai | F15B 9/12 |

(Continued)

FOREIGN PATENT DOCUMENTS

| | | | |
|---|---|---|---|
| CN | 112211859 A | * | 1/2021 |
| WO | WO 1997/037422 | | 9/1997 |
| WO | WO 2014/058370 | | 4/2014 |

OTHER PUBLICATIONS

Screen shot of Machine Design website, having a web address of https://www.machinedesign.com/mechanical-motion-systems/article/21163885/getting-up-to-speed.

*Primary Examiner* — Gregory Robert Weber
(74) *Attorney, Agent, or Firm* — Donald J. Ersler

(57) ABSTRACT

An electro-hydraulic linear ball screw actuator preferably includes an electric motor, a hydraulic tube, an actuator ball screw, a ball nut device, an actuator rod and at least one external hydraulic flow passage. The actuator ball screw is rotated by the electric motor. The ball nut device includes a ball nut base, a piston portion and a rod thread. The ball nut device is retained in the hydraulic tube. The ball nut base includes a plurality of ball bearings, which engage ball threads on the actuator ball screw. The actuator rod is retained on the piston portion. Rotation of the electric motor causes the actuator rod to extend or retract. A first hydraulic chamber is located behind the piston portion and a second hydraulic chamber is located in front of the piston portion. The at least one external hydraulic flow passage transfers hydraulic fluid between the first and second chambers.

20 Claims, 3 Drawing Sheets

(56) References Cited

U.S. PATENT DOCUMENTS

| | | | |
|---|---|---|---|
| 10,925,754 B2* | 2/2021 | Goldfarb | F15B 15/20 |
| 10,935,053 B2* | 3/2021 | Orino | F16K 31/122 |
| 11,092,175 B1* | 8/2021 | Blanding | B64C 13/504 |
| 2021/0364070 A1* | 11/2021 | Keranen | F16H 57/0497 |

* cited by examiner

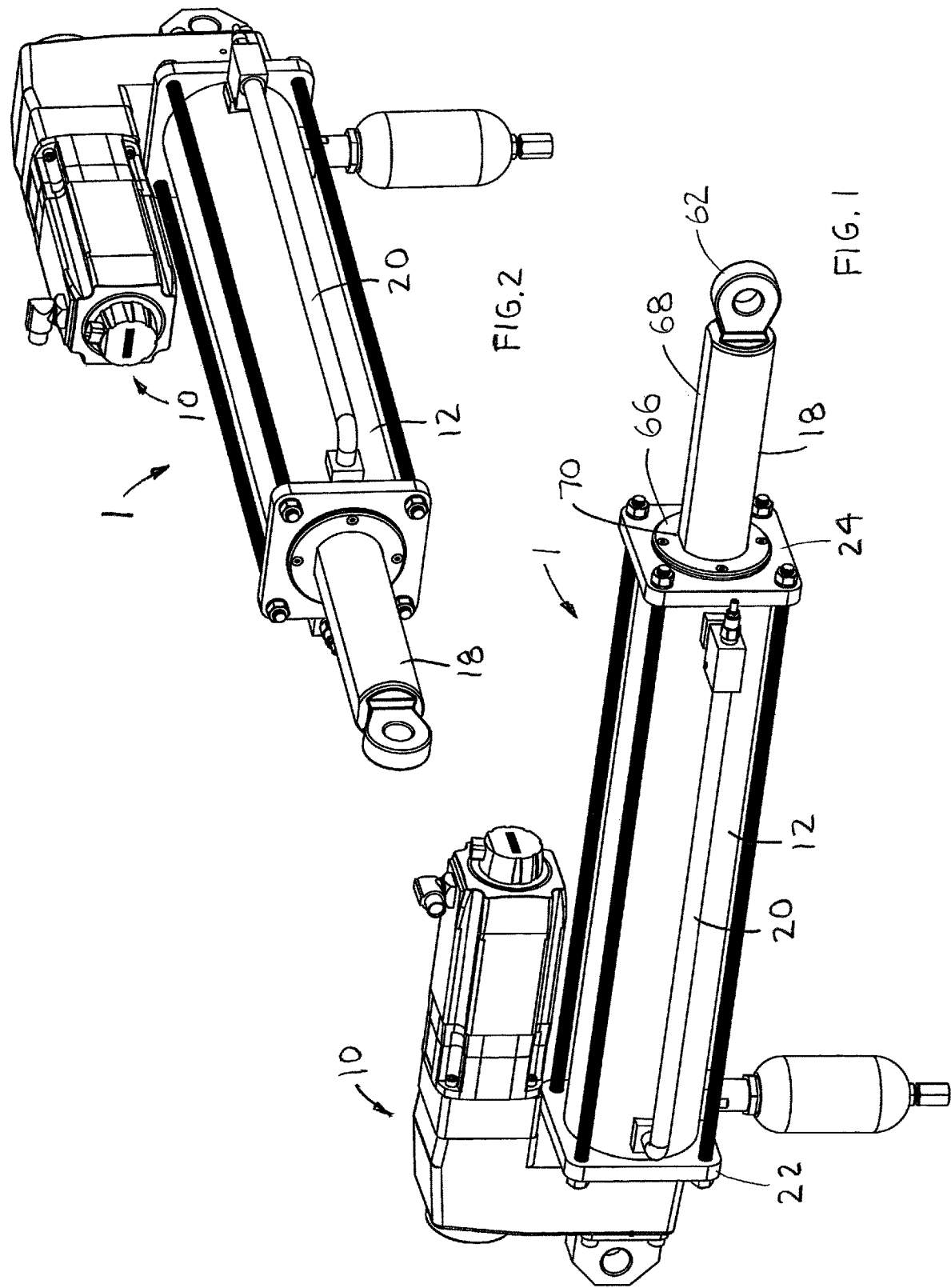

ELECTRO-HYDRAULIC LINEAR BALL SCREW ACTUATORS

BACKGROUND OF THE INVENTION

1. Field of the Invention

The present invention relates generally to heavy duty equipment and more specifically to electro-hydraulic linear ball screw actuators, which are able to provide high precision movement with less maintenance requirements than a hydraulic cylinder.

2. Discussion of the Prior Art

In heavy duty machinery, linear hydraulic cylinders are used extensively, because they have important attributes including high power density, large load handling capability and shock resistance. Hydraulic cylinders are used in a range of heavy load-handling applications in outdoor construction, marine, material handling, aerospace, agriculture equipment, and in other applications. Electric linear actuators are popular in industrial manufacturing and conveying systems. The electric linear actuator includes a motor that powers a lead screw. The lead screw includes a ball nut, which is moved in a linear motion along the lead screw. Electric linear actuators can achieve high precision and speed with little or zero maintenance. However, electric linear cylinders are typically not suitable for harsh operating environments, strong workloads, and large shocks. PCT patent no. WO 1997/037422 to Kimura et al. discloses a motor-driven cylinder. PCT patent no. WO 2014/058370 to Carlsson discloses an actuator.

Accordingly, there is clearly felt need in the art for an electro-hydraulic linear ball screw actuator which is able to provide high precision movement with less maintenance requirements than a hydraulic cylinder; can operate in hostile working environments; and are able to handle heavy loads.

SUMMARY OF THE INVENTION

The present invention provides an electro-hydraulic linear ball screw actuator which provides high precision movement and can operate in hostile working environments. The electro-hydraulic linear ball screw actuator preferably includes an electric motor device, a hydraulic tube, an actuator ball screw, a ball nut device, an actuator rod and at least one external hydraulic flow passage. The hydraulic tube is terminated with a first end cap on a first end and a second end cap on an opposing second end. A first tube diameter extends from the first end cap for insertion into a first end of the hydraulic tube. A second tube diameter extends from the second end cap for insertion into a second end of the hydraulic tube. A plurality of studs are inserted through the first and second end caps. A plurality of nuts are threaded on to the plurality of studs to retain the hydraulic tube between the first and second end caps. One end of the actuator ball screw is rotatably retained in the first end cap. A ball thread is formed on an outer perimeter of the actuator ball screw. The actuator rod is slidably retained in the second end cap.

The ball nut device includes a ball nut base, a piston portion and a rod thread. The ball nut base portion extends from one end of the piston portion and the rod thread extends from an opposing end of the piston portion. At least one O-ring groove is formed in an outer perimeter of the piston portion to receive at least one O-ring. The ball nut base includes a plurality of ball bearings, a ball bearing loop and an actuator ball screw opening. Ball nuts are well known in the art and need not be explained in detail. The actuator ball screw opening is sized to receive the actuator ball screw. The plurality of ball bearings are retained in the ball bearing loop. A portion of the ball bearing loop allows some of the plurality of ball bearings to extend into the actuator ball screw opening and engage the actuator ball screw.

The outer perimeter of the piston portion is sized to be received by an inner perimeter of the hydraulic tube. The actuator rod includes an inner rod perimeter and a threaded entrance on one end. A pin retainer is formed on an opposing end of the actuator rod. The threaded entrance is sized to threadably receive the rod thread. The actuator rod is retained on the piston portion by threading the actuator rod on to the rod thread. A rod bushing is located in the second end cap. The rod bushing in the second end cap slidably supports a length of the actuator rod. At least one gasket plate is attached to the second end cap. A non-rotation flat is formed on a top of the actuator rod. The gasket plate includes a D-shaped opening, which is sized to receive an outer perimeter of the actuator rod. The D-shaped opening prevents the actuator rod and the piston portion from rotating. The actuator ball screw is preferably terminated with a rod bearing. The rod bearing is sized to be received by the inner rod perimeter. The inner rod perimeter slidably and rotatably supports the second end of the actuator ball screw.

A first hydraulic chamber is formed behind the piston portion and a second hydraulic chamber is formed in front of the piston portion. An accumulator communicates with the hydraulic tube, at a rear of the first hydraulic chamber. A first end of each external hydraulic flow passage communicates with a first end (first hydraulic chamber) of the hydraulic tube and a second end of the at least one external hydraulic flow passage communicates with a second end (second hydraulic chamber) of the hydraulic tube. The electric motor device preferably includes an electric motor and a gearbox. The electric motor rotates the actuator ball screw through the gearbox in either clockwise or counter-clockwise directions. The actuator ball screw is engaged with an output of the gearbox.

The electro-hydraulic linear ball screw actuator preferably works in the following way. The actuator rod is extended or retracted by supplying electric current to the electric motor. The electric motor rotates the actuator ball screw through the gearbox. Rotation in one direction by the actuator ball screw causes the ball nut device to move forward and extend the actuator rod. Hydraulic fluid in the second chamber will be forced through the at least one external flow passage into the first chamber. The hydraulic fluid in the first chamber will support the actuator rod through the piston portion. Support for a load on the end of the actuator rod is mainly supported by hydraulic fluid, not the actuator ball screw and ball nut device. The actuator ball screw and ball nut device are used for precision location of the actuator rod. Hydraulic fluid trapped between the plurality of balls in the ball nut device will act as a pump to pressurize the hydraulic fluid.

Accordingly, it is an object of the present invention to provide an electro-hydraulic linear ball screw actuator which is able to provide high precision movement with less maintenance requirements than a hydraulic cylinder and can operate in hostile working environments.

Finally, it is another object of the present invention to provide an electro-hydraulic linear ball screw actuator which is able to support a large load.

These and additional objects, advantages, features and benefits of the present invention will become apparent from the following specification.

BRIEF DESCRIPTION OF THE DRAWINGS

FIG. 1 is a left-side perspective view of an electro-hydraulic linear ball screw actuator in accordance with the present invention.

FIG. 2 is a right-side perspective view of an electro-hydraulic linear ball screw actuator in accordance with the present invention.

DETAILED DESCRIPTION OF THE PREFERRED EMBODIMENTS

Figure 3:
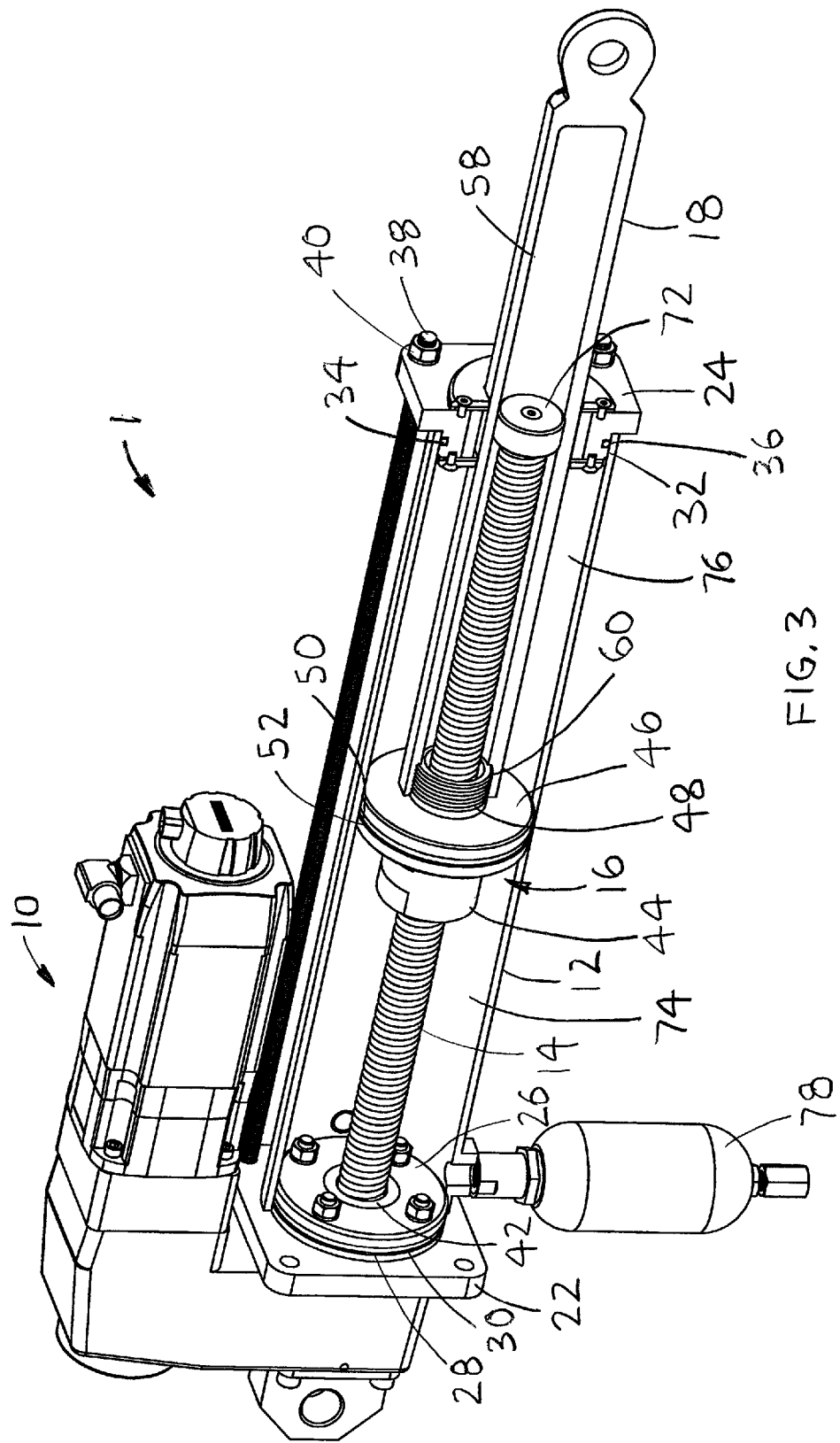
FIG. 3 is a left-side perspective view of an electro-hydraulic linear ball screw actuator with a cutaway of a hydraulic tube and an actuation rod in accordance with the present invention.
Figure 4:
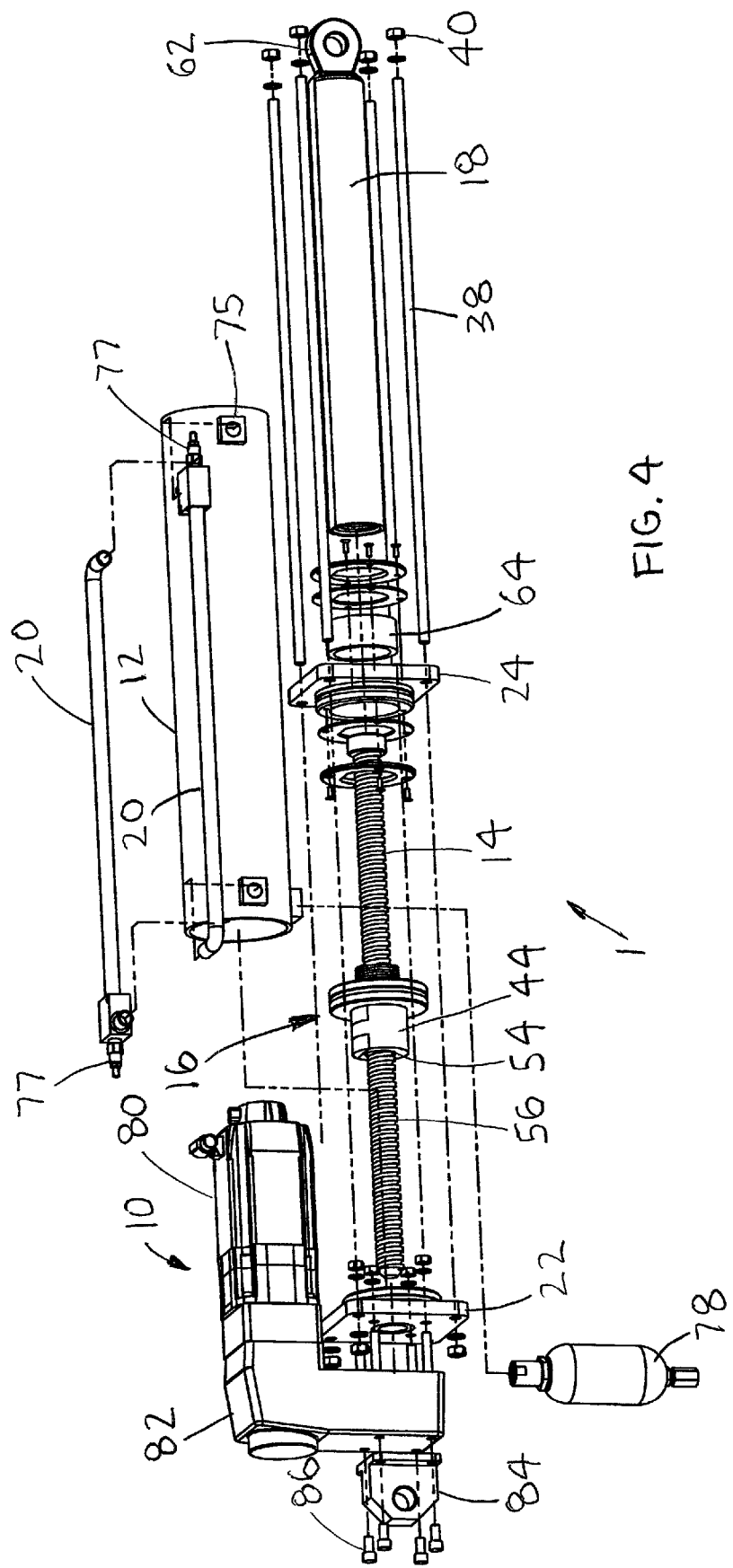
FIG. 4 is an exploded perspective view of an electro-hydraulic linear ball screw actuator in accordance with the present invention.

With reference now to the drawings, and particularly to FIG. 1, there is shown a left-side perspective view of an electro-hydraulic linear ball screw actuator 1. With reference to FIGS. 2-4, the electro-hydraulic linear ball screw actuator 1 preferably includes an electric motor device 10, a hydraulic tube 12, an actuator ball screw 14, a ball nut device 16, an actuator rod 18 and at least one external hydraulic flow passage 20. The hydraulic tube 12 is terminated with a first end cap 22 on one end and a second end cap 24 on an opposing end. A first tube diameter 26 extends from the first end cap 22 for insertion into a first end of the hydraulic tube 12. A first O-ring 28 is retained in a first O-ring groove 30 in the first tube diameter 26. A second tube diameter 32 extends from the second end cap 24 for insertion into a second end of the hydraulic tube 12. A second O-ring 34 is retained in a first O-ring groove 36 in the second tube diameter 32. A plurality of studs 38 are inserted through holes in the first and second end caps 22, 24. A plurality of nuts 40 are threaded on to the plurality of studs 38 to retain the hydraulic tube 12 between the first and second end caps 22, 24. One end of the actuator ball screw 14 is rotatably retained in the first end cap 22. A ball thread is formed on an outer perimeter of the actuator ball screw 14, the ball thread is sized to receive a plurality of ball bearings (not shown) in the ball nut device 16. A screw seal 42 is retained in a counterbore in the first tube diameter 26. The screw seal 42 provides a seal between the actuator ball screw 14 and the first tube diameter 26 to prevent leakage of hydraulic fluid. The actuator rod 18 is slidably retained in the second end cap 24.

The ball nut device 16 includes a ball nut base 44, a piston portion 46 and a rod thread 48. The ball nut base 44 extends from one end of the piston portion 46 and the rod thread 48 extends from an opposing end of the piston portion 46. At least one piston O-ring groove 50 is formed in an outer perimeter of the piston portion 46 to receive at least one piston O-ring 52. The ball nut base 44 includes a plurality of ball bearings, a ball bearing loop and an actuator ball screw opening 54. Ball nuts are well known in the art and need not be explained in detail. However, inventors incorporate by reference in their entirety, the following illustrations shown on the Machine Design website, at web address: www.machinedesign.com/mechanical-motion-systems/article/21163885/getting-up-to-speed The actuator ball screw opening 54 is sized to receive the actuator ball screw 14. The plurality of ball bearings are retained in the ball bearing loop. A portion of the ball bearing loop allows some of the plurality of ball bearings to extend into the actuator ball screw opening 54 and engage ball threads 56 of the actuator ball screw 14.

The outer perimeter of the piston portion 46 is sized to be received by an inner perimeter of the hydraulic tube 12. The actuator rod 18 includes an inner rod perimeter 58 and a threaded entrance 60 on one end. A pin retainer 62 is formed on an opposing end of the actuator rod 18. The threaded entrance 60 is sized to threadably receive the rod thread 48. The actuator rod 18 is retained on the piston portion 46 by threading the actuator rod 18 on to the rod thread 48. A rod bushing 64 is located in the second end cap 24. The rod bushing 64 slidably and rotatably supports a length of the actuator rod 18. At least one bearing plate 66 is attached to the second end cap 24. A non-rotation flat 68 is formed on a top of the actuator rod 18. The bearing plate 66 includes a D-shaped opening 70, which is sized to receive an outer perimeter of the actuator rod 18. The D-shaped opening 70 prevents the actuator rod 18 and the piston portion 46 from rotating. The actuator ball screw 14 is preferably terminated with a rod bearing 72. The rod bearing 72 is sized to be received by the inner rod perimeter 58 to radially and slidably support an end of the actuator ball screw 14.

A first hydraulic chamber 74 is formed behind the piston portion 46 and a second hydraulic chamber 76 is formed in front of the piston portion 46. An accumulator 78 communicates with the hydraulic tube 12, at a rear of the first hydraulic chamber 74. A first end of each external hydraulic flow passage 20 communicates with a first end (first hydraulic chamber 74) of the hydraulic tube 12 through ports 75 and a second end of the at least one external hydraulic flow passage 20 communicates with a second end (second hydraulic chamber 76) of the hydraulic tube 12 through ports 75. It is preferable that each external hydraulic flow passage 20 have a relief valve manifold containing a fill/bleed plug 77. The electric motor device 10 preferably includes an electric motor 80 and a gearbox 82. The electric motor 80 rotates the actuator ball screw 14 through the gearbox 82 in either clockwise or counterclockwise directions. The actuator ball screw 14 is engaged with the gearbox 82. A mount end 84 is preferably attached to the gearbox 82 with fasteners 86.

The electro-hydraulic linear ball screw actuator 1 preferably works in the following manner. The actuator rod 18 is extended or retracted by supplying electric current to the electric motor device 10. The electric motor 80 rotates the actuator ball screw 14 through the gearbox 82. Rotation in one direction by the actuator ball screw 14 causes the ball nut device 44 to move forward and extend the actuator rod 18. Hydraulic fluid in the second chamber 76 will be forced through the at least one external flow passage 20 into the first chamber 74. The hydraulic fluid in the first chamber 74 will support the actuator rod 18 through the piston portion 44. Support for a load on the end of the actuator rod 18 is mainly accomplished through hydraulic fluid, not the actuator ball screw 14 and the ball nut device 46. The actuator ball screw 14 and ball nut device 44 are used for precision location of the actuator rod 18. Hydraulic fluid trapped between the plurality of balls in the ball nut device 44 will act as a pump to pressurize the hydraulic fluid.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed:

1. An electro-hydraulic linear ball screw actuator, comprising:
   an electric motor;
   a hydraulic tube having a first end and a second end;
   an actuator ball screw is rotatably retained in said hydraulic tube, said actuator ball screw is rotated by said electric motor, said actuator ball screw includes a ball thread;
   a ball nut device includes a piston portion and a ball nut base that extends from one end of said piston portion, said ball nut base includes a plurality of ball bearings and an actuator ball screw opening, a first hydraulic chamber is formed between said first end and said piston portion, a second hydraulic chamber is formed between said second end and said piston portion, said actuator ball screw is inserted through said actuator ball screw opening, said plurality of ball bearings are engaged with said ball thread; and
   an actuator rod extends from an opposing end of said piston portion, said actuator rod is selectively detachable from said ball nut, wherein rotation of said actuator ball screw causes said actuator rod to extend or retract, rotation of said electric motor causes hydraulic fluid between said plurality of ball bearings in said ball nut device to pressurize hydraulic fluid in said first chamber supports said actuator rod through said piston portion.

2. The electro-hydraulic linear ball screw actuator of claim 1 wherein:
   said actuator rod includes an inner rod perimeter and a threaded entrance, said inner rod perimeter is sized to receive said actuator ball screw.

3. The electro-hydraulic linear ball screw actuator of claim 2, further comprising:
   a rod bearing is retained on an end of said actuator ball screw, said rod bearing is sized to be received by said inner rod perimeter.

4. The electro-hydraulic linear ball screw actuator of claim 2 wherein:
   a rod thread extends from an opposing end of said piston portion, said threaded entrance is sized threadably receive said rod thread.

5. The electro-hydraulic linear ball screw actuator of claim 1 wherein:
   an outer perimeter of said piston portion is sized to be received by an inner perimeter of said hydraulic tube.

6. The electro-hydraulic linear ball screw actuator of claim 1 wherein:
   a rod flat is formed on said actuator rod, a D-shaped opening is formed on one end of said hydraulic tube, said D-shaped opening is sized to receive an outer perimeter of said actuator rod, said actuator rod does not rotate relative to said hydraulic tube.

7. The electro-hydraulic linear ball screw actuator of claim 1, further comprising:
   an accumulator communicates with said hydraulic tube.

8. An electro-hydraulic linear ball screw actuator, comprising:
   an electric motor;
   a hydraulic tube includes hydraulic fluid;
   an actuator ball screw is rotatably retained in said hydraulic tube, said actuator ball screw is rotated by said electric motor, said actuator ball screw includes a ball thread;
   a ball nut device includes a piston portion and a ball nut base that extends from one end of said piston portion, the hydraulic fluid does not pass through said piston portion, a first hydraulic chamber is formed behind said piston portion, a second hydraulic chamber is formed in front of said piston portion, said ball nut base includes a plurality of ball bearings and an actuator ball screw opening, said actuator ball screw is inserted through said actuator ball screw opening, said plurality of ball bearings are engaged with said ball thread;
   at least one hydraulic flow passage for transferring hydraulic fluid between said first hydraulic chamber and said second hydraulic chamber, said first hydraulic chamber is always directly connected to said second hydraulic chamber through said at least one hydraulic flow passage; and
   an actuator rod extends from an opposing end of said piston portion, wherein rotation of said actuator ball screw causes said actuator rod to extend or retract.

9. The electro-hydraulic linear ball screw actuator of claim 8 wherein:
   said actuator rod includes an inner rod perimeter and a threaded entrance, said inner rod perimeter is sized to receive said actuator ball screw.

10. The electro-hydraulic linear ball screw actuator of claim 9, further comprising:
    a rod bearing is retained on an end of said actuator ball screw, said rod bearing is sized to be received by said inner rod perimeter.

11. The electro-hydraulic linear ball screw actuator of claim 9 wherein:
    a rod thread extends from an opposing end of said piston portion, said threaded entrance is sized threadably receive said rod thread.

12. The electro-hydraulic linear ball screw actuator of claim 8 wherein:
    an outer perimeter of said piston portion is sized to be received by an inner perimeter of said hydraulic tube.

13. The electro-hydraulic linear ball screw actuator of claim 8, further comprising:
    at least one bearing plate is retained on one end of said hydraulic tube, a D-shaped opening is formed in said at least one bearing plate, a rod flat is formed on said actuator rod, said D-shaped opening is sized to receive an outer perimeter of said actuator rod, said actuator rod does not rotate relative to said hydraulic tube.

14. The electro-hydraulic linear ball screw actuator of claim 8, wherein:
    a hydraulic system of said electro-hydraulic linear ball screw actuator does not rely upon an external hydraulic pump.

15. An electro-hydraulic linear ball screw actuator, comprising:
    an electric motor;
    a hydraulic tube is terminated with a first end cap on a first end and a second end cap on a second end;
    an actuator ball screw is rotatably retained in said hydraulic tube with said first end cap, said actuator ball screw is rotated by said electric motor, said actuator ball screw includes a ball thread;
    a ball nut device includes a piston portion and a ball nut base that extends from one end of said piston portion, a first hydraulic chamber is formed behind said piston portion, a second hydraulic chamber is formed in front of said piston portion, said ball nut base includes a plurality of ball bearings and an actuator ball screw opening, said actuator ball screw is inserted through said actuator ball screw opening, said plurality of ball bearings are engaged with said ball thread;

an accumulator directly communicates with said first hydraulic chamber; and an actuator rod extends from an opposing end of said piston portion, said actuator rod is slidably retained in said second end cap, wherein rotation of said actuator ball screw causes said actuator rod to extend or retract, rotation of said electric motor causes hydraulic fluid between said plurality of ball bearings in said ball nut device to pressurize hydraulic fluid in said first chamber supports said actuator rod through said piston portion.

16. The electro-hydraulic linear ball screw actuator of claim 15 wherein:

said actuator rod includes an inner rod perimeter and a threaded entrance, said inner rod perimeter is sized to receive said actuator ball screw.

17. The electro-hydraulic linear ball screw actuator of claim 16, further comprising:

a rod bearing is retained on an end of said actuator ball screw, said rod bearing is sized to contact said inner rod perimeter.

18. The electro-hydraulic linear ball screw actuator of claim 16 wherein:

a rod thread extends from an opposing end of said piston portion, said threaded entrance is sized threadably receive said rod thread.

19. The electro-hydraulic linear ball screw actuator of claim 16 wherein:

an outer perimeter of said piston portion is sized to be received by an inner perimeter of said hydraulic tube.

20. The electro-hydraulic linear ball screw actuator of claim 15, further comprising:

at least one bearing plate is retained on said second end cap, a D-shaped opening is formed in said at least one bearing plate, a rod flat is formed on said actuator rod, said D-shaped opening is sized to receive an outer perimeter of said actuator rod, said actuator rod does not rotate relative to said hydraulic tube.

* * * * *